United States Patent Office 3,505,381
Patented Apr. 7, 1970

3,505,381
PROCESS FOR THE MANUFACTURE OF LINEAR SILICIC ESTER SILAZANES
Hans-Joachim Kotzsch, Rheinfelden, and Roshdy M. Ismail, Spich, Germany, assignors to Dynamit Nobel Aktiengesellschaft, Troisdorf, Germany
No Drawing. Filed Aug. 7, 1967, Ser. No. 658,666
Claims priority, application Germany, Aug. 8, 1966, D 50,785
Int. Cl. C07f 7/04, 7/18
U.S. Cl. 260—448.8     10 Claims

ABSTRACT OF THE DISCLOSURE

Reaction of dihalo silanes with dihydric phenols and reaction of this product with ammonia or amine to produce linear silicic ester silazane polymers and/or oligomers of the formula:

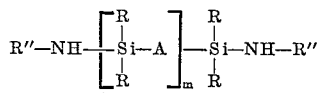

wherein R, R' and R" are hydrogen or hydrocarbon groups which are the same or different, $m$ is 1 to 50, and A is a dihydric phenol residue.

---

Silicic ester silazane polymers and oligomers are generally known. These materials have been produced in the past by the transposition of cyclotrisilazane with bivalent phenols. However, manufacture by this method is uneconomical because the silazane is obtainable only at great expense. Furthermore, the silazane must satisfy certain purity requirements in order to achieve products of sufficiently great condensation. Another disadvantage is the lack of uniformity of molecular structure and, as a result, the lack of reproducibility of the chain structure of the polymers due to the formation of di- and tri-silazane segments which, due to their great sensitivity, considerably diminish the resistance of the condensation polymers to hydrolysis.

It is therefore an object of this invention to provide a novel process for producing silicic ester silazane polymers and oligomers.

Other and additional objects of this invention will become apparent from a consideration of this entire specification, including the claims hereof.

In accordance with and fulfilling these objects, one aspect of this invention resides in a process comprising the condensation reaction of at least one dihalo silane with at least one dihydric phenol to produce a linear silicic ester having up to about fifty silicon atoms in the chain; and then reaction of this ester with ammonia, at least one hydrogen-bearing amine or a mixture thereof to produce a linear silicic ester silazane.

According to this invention, the dihalo silane reactant has a formula:

wherein X is the same or different halogen, preferably chlorine; R is a cyclo alkyl or an aryl group; and R' is hydrogen, an alkyl, a cyclo-alkyl or an aryl group. The cyclo-alkyl group can be exemplified by cyclo-butyl, cyclo-pentyl, cyclo-hexyl, cyclo-heptyl and the like, as well as such cyclo-alkyl groups having non-reactive substituents thereon, such as, for example, alkyl substituents, particularly lower alkyl substituents, having up to about six carbon atoms, e.g., methyl, ethyl, propyl, butyl, hexyl, etc. The aryl group may be mono or poly cyclic and may have non-reactive substituents thereon, such as, for example, alkyl, particularly lower alkyl, having up to about six carbon atoms, e.g., methyl, ethyl, propyl, butyl, hexyl, etc. Specifically, exemplary aryl groups include phenyl, naphthyl and biphenyl. The alkyl group may be normal or isomeric in configuration and may be of substantially any number of carbon atoms. It is preferred that this alkyl group have up to about 8 carbon atoms, e.g., methyl, ethyl, propyl, butyl, 2-ethyl, hexyl, etc.

By way of example, the following dihalogen silanes have proven suitable for the performance of the preliminary condensation: dicyclohexyldichlorosilane, cyclohexylmethyldichlorosilane, dinaphthyldichlorosilane, hydrogen phenyldichlorosilane, methylphenyldichlorosilane, diphenyldichlorosilane, etc. Mixtures of the above-named dihalogen silanes can also be used.

According to this invention, dihydric phenols which are suitable for reaction with the dihalo silanes set forth above are those which do not react with halo silanes to form cyclic products. These include mono and poly cyclic phenols, which polycyclic phenols may have fused rings or joined by non-fused rings. Further, there are included poly cyclic phenols wherein the rings are joined together by a bridging atom or group, such as an oxygen, sulfur or carbon atom, or alkylene, alkylene ether or alkylene thioether groups. In the case of alkylene containing groups, the group may have up to about 6 carbon atoms therein, preferably up to 4 carbon atoms. The phenyl ring portions of the phenol reactant may be substituted with one or more non-reactive groups, such as alkyl, particularly lower alkyl, groups. These alkyl groups may be exemplified by methyl, ethyl, propyl, butyl, hexyl, etc.

The two hydroxyl groups on the dihydric phenol reactant may both be on the same or may be on different phenyl rings in any position, except ortho, with respect to each other.

Exemplary dihydric phenols suitable for use in this process include:

Resorcinol,
hydroquinone,
bis-(4-hydroxyphenyl)-methane,
bis-(4-hydroxy-3-methylphenyl)-methane,
bis-(4-hydroxy-3,5-dichlorophenyl)-methane,
bis-(4-hydroxy-3,5-dibromophenyl)-methane,
bis-(4-hydroxy-3,5-difluorophenyl)-methane,
1,1-bis-(d-hydroxyphenyl)-ethane,
2,2-bis-(4-hydroxymethyl)-propane,
2,2-bis-(3-hydroxyphenyl)-propane,
2,2-bis(4-hydroxyphenyl)-butane,
2,2-bis-(4-hydroxyphenyl)-4-(methyl)-pentane,
2,2-bis-(4-hydroxy-3-methylphenyl)-propane,
2,2-bis-(4-hydroxy-3-chlorophenyl)-propane,
2,2-bis-(4-hydroxy-3,5-dichlorophenyl)-propane,
2,2-bis-(4-hydroxy-3,5-dibromophenyl)-propane,
bis-(4-hydroxyphenyl)-phenylmethane,
bis-(4-hydroxyphenyl)-phenylmethylmethane,
bis-(4-hydroxyphenyl)-diphenylmethane,
bis-(4-hydroxyphenyl)-(4-methylphenyl)-methane,
1,1-bis-bis-(4-hydroxyphenyl)-1-(3-methylphenyl)-propane,
1,1-bis-(4-hydroxyphenyl)-2,2,2-trichloroethane,
bis-(4-hydroxyphenyl)-(4-chlorophenyl)-methane,
1,1-bis-(4-hydroxyphenyl)-cyclohexane,
bis-(4-hydroxyphenyl)-cyclohexylmethane,
4,4'-dihydroxydiphenyl,
3,3' and 5,5'-tetramethyl-4,4'-dihydroxydiphenyl,
dihydroxynaphthalene,
4,4'-dihydroxydiphenylsulfone, 4,4-dihydroxydiphenylether, etc. Mixtures of the above-named bivalent phenols can also be used.

In accord with this invention, the preliminary condensation product, the silicic ester, is reacted with one or more primary amines or ammonia. Aliphatic, cyclo aliphatic and/or aromatic amines may be used. It is within the scope of this invention to use amines which have substituents on the aliphatic, cyclo aliphatic or aromatic constituents thereof which substituents may themselves be aliphatic, cyclo aliphatic or aromatic. The aliphatic constituents and substituents are exemplified by alkyl, alkyl ether, hydroxy alkyl, etc. groups, preferably lower alkyl, e.g., containing up to about 6 carbon atoms, groups. The cyclo aliphatic groups are exemplified by cycloalkyl and substituted cycloalkyl groups, preferably containing about 4 to 12 carbon atoms, as well as heterocyclic groups, such as those containing oxygen, sulfur or nitrogen in the ring, such as furyl amines and piperidinyl amines. The aromatic amines may have one or more rings, fused or non-fused, on the amino group, and these rings may be further substituted, e.g., by lower alkyl groups.

Exemplary of the amine reactants are: methylamine, ethylamine, isopropylamine, cyclohexylamine, aniline, toluidines, etc.

The manufacture of the preliminary condensation products is best performed in a known manner by the reaction of the dihydric phenols with the dihalogen silanes in hypostoichiometric quantities, i.e., for each mole of dihalogen silane somewhat less than 1 mole of bivalent phenol is used. The amount actually used is governed by the desired degree of condensation of the preliminary condensation products. Since $m$ can be a whole or broken number from 1 to 50, $m=1$ signifies that dihydric pheno and dihalo silane are used in a molar ratio of 1:2, and $m=50$ means that the corresponding molar ratio is 0.98:1.

Since the rate of the condensation reaction decreases as the molecule size increases, the resultant preliminary condensation products possess mostly uniform molecule sizes corresponding to the molar ratio of bivalent phenols to dihalogen silanes.

The reaction of the dihydric phenols with the dihalogen silanes can take place either in the fused state or in solution. When solvents are used, it is best to use those which are inert towards the reactants.

The preliminary condensation can also be performed with the addition of condensation adjuvants. Appropriate condensing agents are catalytically active tertiary amines which catalyze the splitting off of hydrogen halide. The condensation can also be performed in the presence of stoichiometric amounts of an acid-binding agent, such as alkali or alkaline-earth carbonates or amines which are capable of bonding to the hydrogen halide to form alkali halides or alkaline-earth halides, or amine hydrochlorides, as the case may be. If tertiary amines are used as catalysts for the splitting off of HCl, it is best to use those whose HCl tension at normal pressure is less than 760 mm. Hg, such as, for example, N,N-dimethylaniline, p-bromodimethylaniline and benzyldimethylaniline. The tertiary amines are preferably added in a quantity of 0.1 to 2 mole percent with reference to the quantity of dihalogen silane.

The preliminary condensation products are manufactured at 50 to 200° C. at normal pressure. However, it may be advantageous to use a pressure of up to 12 atmospheres gauge pressure. The use of such pressure, however, does not offer a great advantage over the atmospheric-pressure method.

The preliminary condensation products thus manufactured are taken as they are or are dissolved in inert solvents, such as hydrocarbons or ethers, and in the one case, by the introduction of a great excess of ammonia or gaseous amines, or in the other case, by the addition of ammonia or the said amines in liquid form, they are transformed in a rapid reaction, either at atmospheric pressure or by a low-pressure process, into linear silicic ester silazanes of partially high molecular weight, with the precipitation of small amounts of corresponding halides, the said silazanes being isolated in the form of fused or thermoplastic masses by common methods, such as extraction, filtration or centrifugation followed by evaporation of the solvent.

Excess amounts of ammonia or of a primary amine are added to the preliminary condensation products in solution and under temperature, e.g., controlled by a circulating bath, the linear silazane esters developing in an exothermic reaction. If desired, the reaction can also be performed under pressure. Initial pressures up to 20 atmospheres have proven advantageous. The reaction is performed as a rule at temperatures of 20 to 80° C., preferably of 20 to 60° C.

Suitable inert solvents, both for the manufacture of the preliminary condensation products and for the reaction with ammonia and/or primary amines in the meaning of the present invention, are both aliphatic and aromatic hydrocarbons and simple and cyclic ethers. Suitable aliphatic hydrocarbons are either single compounds or mixtures such as pentane, hexane, isooctane, petroleum ethers (B.P. 60–80°) and benzene fractions, as, for example, those having a boiling range from 120 to 180° C. Benzene, toluene and xylene are examples of suitable aromatic hydrocarbons. Ethers which can be used for the performance of the reactions are, for example, diisopropylether, diisoamyl ether, diphenyl ether, 1,4-dioxane, dioxolanes, etc. The foregoing enumeration of suitable ethers shows that both aliphatic and aromatic, open-chain and cyclic ethers can be used.

Surprisingly, it has developed that the above-described difficulties of the prior art can be obviated in a very simple manner according to the invention by first manufacturing the preliminary condensation products with a well-defined degree of condensation, and then transforming them by reaction with ammonia and/or primary amines of the above types into monomeric, oligomeric or polymeric silazanes, resulting in the production of silazanes having a mainly uniform structure and easily reproducible properties. The process is also particularly economical because the manufacture of the preliminary condensation products eliminates the detour through the cyclosilazanes, and due to the homogeneity of the reactions, all of the organic silicon is rendered useable for the desired product, whereas in the manufacture of cyclosilazane, considerable quantities of organic silicon are lost due to the development of silazane byproducts of different structure which have to be separated.

The formation of linear silazane esters according to the invention is especially surprising, because cyclization to stable rings is otherwise the rule in the case of silazanes.

The thermoplastic products manufactured according to the invention are, for example, intermediate products for the manufacture of plastics, additives for varnishes and resins, hardeners for epoxy resins, etc. They are suitable for the manufacture of coatings on glass, mineral substances and metals, for example. They have a very high thermostability.

The following examples are illustrative of the practice of this invention without in any way being limiting thereon.

EXAMPLE 1

In a 1-liter flask equipped with an anchor agitator and a reflux condenser, 0.5 mole of resorcinol was suspended in 300 ml. of toluene and the apparatus and charge were dried by distillation. Then 1 ml. of N,N-dimethylaniline was added as a catalyst and 0.75 mole of diphenyldichlorosilane was added to the boiling solution drop by drop with agitation over a period of 45 minutes. The reaction started immediately and took place with a strong evolution of HCl. The HCl was taken from the condenser output through a drying tower containing $CaCl_2$ and absorbed for control purposes in 2 N NaOH. After 4 hours, 1 mole of HCl had been yielded and the reaction thus ended. After cooling, the dissolved preliminary condensation product was transferred to a 1-liter glass autoclave which was equipped with a gland-less agitator and a jacket of circulating coolant or heating liquid. At an internal temperature of 30° C. and an agitator speed of 1200 r.p.m. 22 g. of liquid ammonia was added drop by drop within 30 minutes from a pressurized buret, whereupon ammonium chloride immediately separated. The internal temperature at the same time rose to 52° C. and the pressure increased to a maximum of 7.8 atmospheres. After the addition of liquid ammonia had ended, the pressure fell rapidly. After another 30 minutes, the mixture was heated at 60° C. for one hour, by which time an end pressure of 4.4 atmospheres had established itself. During the cooling, pressure was let off with agitation, and the autoclave was flushed out with nitrogen. The ammonium chloride was removed by filtration and the reaction mixture was concentrated by evaporation in vacuo, resulting in the production of 194 g. of diphenylsilazane resorcyl ester having a flow point of 62° C. Elemental analysis produced values in agreement with the structure:

$H_2N$—$(Si(C_6H_5)_2$—$OC_6H_4O)$—$Si(C_6H_5)_2NH_2$

*Analysis.*—Calculated (percent): C, 72.52; H, 5.16; Si, 10.55; N, 3.51. Found (percent): C, 72.39; H, 5.28; Si, 10.80; N, 3.21.

Molecular weight determination in the vapor pressure osmometer showed 761 (calculated 795).

EXAMPLE 2

0.5 mole of p,p'-diphenol was condensed as in Example 1 with 0.75 mole of diphenyldichlorosilane, and the condensation product was reacted with ammonia and extracted. 234 g. were isolated of diphenylsilazane-p,p'-diphenyl-ester, flow point 117° C. Elemental analysis produced values in harmony with the structure:

$H_2N$—$(Si(C_6H_5)_2$—$O(C_6H_4)_2O)_2$—$Si(C_6H_5)_2NH_2$

*Analysis.*—Calculated (percent): C, 76.18; H, 5.28; Si, 8.88; N, 2.96. Found (percent): C, 76.18; H, 5.18; Si, 8.80; N, 2.80.

Molecular weight determination in the vapor pressure osmometer showed 906 (calculated 795).

EXAMPLE 3

0.5 mole of hydroquinone was condensed as in Example 1 with 0.6 mole of diphenyldichlorosilane; the condensation product was reacted with ammonia and extracted. 167 g. of diphenylsilazanehydroquinone ester was obtained having a flow point of 35° C. Elemental analysis produced values in harmony with the structure:

$H_2N$—$(Si(C_6H_5)_2OC_6H_4O)_5$—$Si(C_6H_5)_2NH_2$

*Analysis.*—Calculated (percent): C, 73.48; H, 5.08; Si, 10.09; N, 1.67. Found (percent): C, 73.36; H, 5.09; Si, 10.12; N, 1.74.

Molecular weight determination in the vapor pressure osmometer showed 1620 (calculated 1665).

EXAMPLE 4

A preliminary condensation product of 0.3 mole of 2,2-bis-(4-hydroxyphenyl)-propane (diane) and 0.4 mole of diphenyldichlorosilane in 200 ml. of benzene, which had been prepared as in Example 1, was further reacted by adding a solution of 0.42 mole of aniline in 50 ml. of benzene drop by drop with agitation to the boiling mixture and boiling for 3 hours. Then the mixture was cooled, reprecipitated with about 30 ml. of ether, and the aniline hydrochloride was removed by filtration. 143 g. of an N-phenyldiphenylsilazanedianyl ester having a flow point of 142° C. was isolated by concentration by evaporation at a temperature rising to 190° C., in a vacuum toward the end. Elemental analysis produced values in harmony with the following structure:

$C_6H_5NH$—$(Si(C_6H_5)_2$—$OC_6H_4 \cdot C_3H_6 \cdot$
$\qquad C_6H_4O)_3$—$Si(C_6H_5)_2NHC_6H_5$

*Analysis.*—Calculated (percent): C, 79.24; H, 5.95; Si, 7.04; N, 1.76. Found (percent): C, 78.98; H, 5.72; Si, 7.20; N, 1.65.

Molecular weight determination in the vapor pressure osmometer showed 1510 (calculated 1592).

EXAMPLE 5

To the preliminary condensation product described in Example 4, 16 g. of liquid methylamine was added drop by drop from a pressurized buret at 30° C. internal temperature and an agitator speed of 500 r.p.m. in the glass autoclave; immediately, methyl ammonium chloride precipitated. At the same time, the internal temperature rose to 46° C. and the pressure to a maximum of 2.3 atmospheres. After the addition of the methylamine had been completed, the mixture was heated for 2 hours at 60° C., a final pressure of 1.4 atmospheres establishing itself. Through filtration and concentration by evaporation, 126 g. of an N-methyldiphenylsilazanedianyl ester was isolated, having a flow point of 120° C. Elemental analysis produced figures in harmony with the following structure:

$H_3CNH$—$(Si(C_6H_5)_2$—
$\qquad OC_6H_4 \cdot C_3H_6 \cdot C_6H_4O)_3Si(C_6H_5)_2NHCH_3$

*Analysis.*—Calculated (percent): C, 77.84; H, 6.18; Si, 7.64; N, 1.91. Found (percent): C, 77.90; H, 6.20; Si, 7.88; N, 1.73.

Molecular weight determination in the vapor pressure osmometer showed 1420 (calculated 1468).

EXAMPLE 6

0.3 mole of diane was condensed with 0.35 mole of phenylmethyldichlorosilane in 200 ml. of benzene in the same manner as in Example 1. The condensation product was reacted with ammonia to produce the silazane ester and the latter was extracted. 92 g. of phenylmethylsilazanedianyl ester was isolated, having a flow point of 76° C. Elemental analysis produced values agreeing with the following structure:

$H_2N$—$(Si(CH_3)(C_6H_5)$—
$\qquad OC_6H_4 \cdot C_3H_6 \cdot C_6H_4O)_6Si(CH_3)(C_6H_5)NH_2$

*Analysis.*—Calculated (percent): C, 74.78; H, 6.51; Si, 8.78; N, 1.26. Found (percent): C, 74.81; H, 6.57; Si, 9.10; N, 1.10.

EXAMPLE 7

1 mole of diane and 1.05 moles of diphenyldichlorosilane were condensed by the process described in Example 1 and reacted with ammonia to form the silazane ester. 406 g. of diphenylsilazanedianyl ester was obtained, having the flow point of 115° C.

$H_2N$—$((C_{27}H_{24}O_2Si)_{20}C_{12}H_{14}N_2Si)$—$NH_2$

*Analysis.*—Calculated (percent): C, 79.10; H, 5.94; Si, 7.02; N, 0.33. Found (percent): C, 79.00; H, 6.02; Si, 7.22; N, 0.32.

EXAMPLE 8

In an analogous manner, similar silicic ester silazane oligomers and polymers are produced where the silane reactant is methyl cyclo hexyl dichloro silane and methyl phenyl dibromo silane.

What is claimed is:

1. In the method of producing a silicic ester silazane of the formula:

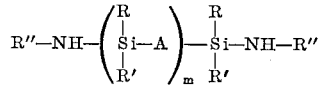

wherein R is selected from the group consisting of cyclo-alkyl and aryl; R' is selected from the group consisting of hydrogen, alkyl, cyclo-alkyl and aryl; R'' is selected from the group consisting of hydrogen, alkyl, cyclo-alkyl and aryl; A is a dihydric phenol residue; and m is about 1 to 50; by the reaction of a dihalo silane, a dihydric phenol and a member selected from the group consisting of ammonia and primary amines; the improvement which comprises first reacting said dihydric phenol with said dihalo silane to produce a silicic ester of the formula:

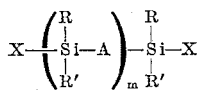

wherein X is halo; and then reacting such silicic ester with said ammonia or primary amino group member.

2. Improved process as claimed in claim 1, wherein said silane-phenol reaction is carried out with an excess of silane.

3. Improved process as claimed in claim 2, wherein said silane-phenol reaction is carried out in the liquid phase at a temperature of about 50–200° C. and a pressure of up to about 12 atmospheres.

4. Improved process as claimed in claim 1, wherein said silicic ester-amine reaction is carried out in the liquid phase at about 20–80° C. and a pressure up to about 20 atmospheres.

5. Improved process as claimed in claim 1, carried out in a solvent medium.

6. Improved process as claimed in claim 1, wherein the mole ratio of phenol to silane is about 0.5–0.98:1.

7. Improved process as claimed in claim 1, wherein said phenol-silane reaction is carried out in the presence of about 0.1–2 mole percent, based upon said silane, of at least one tertiary amine.

8. Improved process as claimed in claim 1, wherein said phenol reactant is at least one member of the group consisting of resorcinol,
hydroquinone,
bis-(4-hydroxyphenyl)-methane,
bis-(4-hydroxy-3-methylphenyl)-methane,
bis-(4-hydroxy-3,5-dichlorophenyl)-methane,
bis-(4-hydroxy-3,5-dibromophenyl)-methane,
bis-(4-hydroxy-3,5-difluorophenyl)-methane,
1,1-bis-(d-hydroxyphenyl)-ethane,
2,2-bis-(4-hydroxyphenyl)-propane,
2,2-bis-(3-hydroxyphenyl)-propane,
2,2-bis-(4-hydroxyphenyl)-butane,
2,2-bis-(4-hydroxyphenyl)-4-(methyl)-pentane,
2,2-bis-(4-hydroxy-3-methylphenyl)-propane,
2,2-bis-(4-hydroxy-3-chlorophenyl)-propane,
2,2-bis-(4-hydroxy-3,5-dichlorophenyl)-propane,
2,2-bis-(4-hydroxy-3,5-dibromophenyl)-propane,
bis-(4-hydroxyphenyl)-phenylmethane,
bis-(4-hydroxyphenyl)-phenylmethylmethane,
bis-(4-hydroxyphenyl)-diphenylmethane,
bis-(4-hydroxyphenyl)-(4-methylphenyl)-methane,
1,1-bis-(4-hydroxyphenyl)-1-(3-methylphenyl)-propane,
1,1-bis-(4-hydroxyphenyl)-2,2,2-trichloroethane,
bis-(4-hydroxyphenyl)-(4-chlorophenyl)-methane,
1,1-bis-(4-hydroxyphenyl)-cyclohexane,
bis-(4-hydroxyphenyl)-cyclohexylmethane,
4,4'-dihydroxyphenyl,
3,3' and 5,5'-tetramethyl-4,4'-dihydroxydiphenyl,
dihyroxynapthalene,
4,4'-dihydroxydiphenylsulfone and
4,4-dihydroxydiphenylether.

9. Improved process as claimed in claim 1, wherein said silane reactant is at least one member of the group consisting of dicyclohexyldichlorosilane, cyclohexylmethyldichlorosilane, dinaphthyldichlorosilane, hydrogen phenyldichlorosilane, methylphenyldichlorosilane and diphenyldichlorosilane.

10. Improved process as claimed in claim 1, wherein said amine reactant is at least one member of the group consisting of methylamine, ethylamine, isopropylamine, cyclohexylamine, aniline and toluidine.

References Cited

UNITED STATES PATENTS

| | | | |
|---|---|---|---|
| 3,133,110 | 5/1964 | Morehouse et al. | 260—448.2 |
| 3,293,211 | 12/1966 | Krimm et al. | 260—448.8 XR |
| 3,354,194 | 11/1967 | Kaufman | 260—448.8 |
| 3,341,494 | 9/1967 | Millward | 260—448.8 XR |
| 3,367,978 | 2/1968 | White | 260—448.8 XR |

OSCAR R. VERTIZ, Primary Examiner

P. F. SHAVER, Assistant Examiner

U.S. Cl. X.R.

260—2, 46.5

PO-1050
(5/69)

UNITED STATES PATENT OFFICE
CERTIFICATE OF CORRECTION

Patent No. 3,505,381    Dated April 7, 1970

Inventor(s) HANS-JOACHIM KOTZSCH and ROSHDY M. ISMAIL

It is certified that error appears in the above-identified patent and that said Letters Patent are hereby corrected as shown below:

Column 5, line 20, "$H_2N-(Si(C_6H_5)_2-OC_6H_4O)-Si(C_6H_5)_2NH_2$"

should be --$H_2N-(Si(C_6H_5)_2-OC_6H_4O)_2-Si(C_6H_5)_2NH_2$ --

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents